(12) United States Patent
Lee et al.

(10) Patent No.: US 12,347,620 B2
(45) Date of Patent: Jul. 1, 2025

(54) MULTILAYER ELECTRONIC COMPONENT

(71) Applicant: SAMSUNG ELECTRO-MECHANICS CO., LTD., Suwon-si (KR)

(72) Inventors: Seung Hwan Lee, Suwon-si (KR); Chul Tack Lim, Suwon-si (KR); Han Eol Cho, Suwon-si (KR); Ye Rin Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 142 days.

(21) Appl. No.: 18/118,412

(22) Filed: Mar. 7, 2023

(65) Prior Publication Data
US 2024/0062963 A1 Feb. 22, 2024

(30) Foreign Application Priority Data
Aug. 22, 2022 (KR) .......................... 10-2022-0104588

(51) Int. Cl.
*H01G 4/12* (2006.01)
*H01G 4/30* (2006.01)

(52) U.S. Cl.
CPC ............. *H01G 4/1236* (2013.01); *H01G 4/30* (2013.01)

(58) Field of Classification Search
None
See application file for complete search history.

(56) References Cited

U.S. PATENT DOCUMENTS

| 11,264,174 | B2* | 3/2022 | Tsuru | C04B 35/62807 |
|---|---|---|---|---|
| 11,581,144 | B2* | 2/2023 | Seo | H01G 4/232 |
| 2011/0118104 | A1* | 5/2011 | Hashimoto | H01G 4/30 |
| | | | | 501/138 |
| 2014/0211367 | A1* | 7/2014 | Morita | H01G 4/30 |
| | | | | 361/301.4 |
| 2015/0200055 | A1* | 7/2015 | Ishida | H01G 4/012 |
| | | | | 361/301.4 |

(Continued)

FOREIGN PATENT DOCUMENTS

| JP | 9-148175 A | 6/1997 |
|---|---|---|
| JP | 2010-183024 A | 8/2010 |

OTHER PUBLICATIONS

Extended European Search Report issued in corresponding European Patent Application No. 23160431.5 dated Mar. 5, 2024.

*Primary Examiner* — Dion R. Ferguson
(74) *Attorney, Agent, or Firm* — MORGAN, LEWIS & BOCKIUS LLP (57) ABSTRACT

A multilayer electronic component according to an embodiment of the present disclosure includes: a body including an active portion including a plurality of first dielectric layers and first and second internal electrodes alternately disposed between the first dielectric layers to form capacitance, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and first and second external electrodes disposed on the body and connected to the first and second internal electrodes, respectively, wherein the plurality of first dielectric layers includes stabilized zirconia.

19 Claims, 5 Drawing Sheets

(56) References Cited

U.S. PATENT DOCUMENTS

| | | |
|---|---|---|
| 2016/0071649 A1 | 3/2016 | Okamoto et al. |
| 2022/0028620 A1* | 1/2022 | Tsuru ..................... H01G 4/224 |
| 2022/0189693 A1* | 6/2022 | Seo ........................ H01G 4/248 |
| 2023/0046855 A1* | 2/2023 | Inomata ............... H01G 4/1236 |
| 2023/0223240 A1* | 7/2023 | Pape ..................... C04B 35/505 |
| | | 118/715 |
| 2024/0062963 A1* | 2/2024 | Lee ...................... H01G 4/1236 |

* cited by examiner

MULTILAYER ELECTRONIC COMPONENT

CROSS-REFERENCE TO RELATED APPLICATION(S)

This application claims benefit of priority to Korean Patent Application No. 10-2022-0104588 filed on Aug. 22, 2022 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC) that is one of the multilayer electronic components is a chip-type condenser mounted on a printed circuit board of various electronic products such as imaging devices like a liquid crystal display device (LCD) and a plasma display device panel (PDP), computers, smartphones, and serves to charge or discharge electricity.

These multilayer ceramic capacitors may be used as components in a variety of electronic devices thanks to their small sizes, high capacity, and ease of mounting. As various electronic devices such as computers and mobile devices have become miniaturized and capable of high-output, the demand for miniaturization and higher capacity for multilayer ceramic capacitors is increasing.

On the other hand, when manufacturing dielectric powder used in the MLCC, a milling process may be used to atomize the dielectric powders, in which zirconium beads may be used as a media. Due to the characteristics of the milling process, zirconium (Zr), a component of zirconium beads, may be introduced into the dielectric powder as an impurity, and the zirconium introduced as an impurity has been identified as a factor that may affect various characteristics such as electrical properties, dielectric capacity, a dissipation factor (DF), and breakdown voltage (BDV) of the dielectric powder.

SUMMARY

An aspect of the present disclosure is to provide multilayer electronic components with improved electrical properties, dielectric capacity, DF and BDV, etc. by adding stabilized zirconia to the dielectric composition.

However, various problems to be solved by the present disclosure are not limited to the above-described contents, and it will become clearer to understand during the process of describing specific embodiments of the present disclosure.

A multilayer electronic component according to an embodiment of the present disclosure comprises an active portion including first dielectric layers, where at least one of the first dielectric layers includes stabilized zirconia, and first and second internal electrodes alternately disposed between the first dielectric layers to form capacitance, a body including first and second surfaces opposing each other in a first direction, third and fourth surfaces connected to the first and second surfaces and opposing each other in a second direction, and fifth and sixth surfaces connected to the first to fourth surfaces and opposing each other in a third direction; and first and second external electrodes disposed on the body and connected to the first and second internal electrodes, respectively.

The multilayer electronic component according to another embodiment of the present disclosure comprises a body including an active portion including a first dielectric layers, first and second internal electrodes alternately disposed between the first dielectric layers to form capacitance, and first and second surfaces opposing each other in a first direction, third and fourth surfaces connected to the first and second surfaces and opposing each other in a second direction, and fifth and sixth surfaces connected to the first to fourth surfaces and opposing each other in a third direction; and including first and second external electrodes disposed on the body and connected to the first and second internal electrodes, respectively, wherein at least one of the first dielectric layers includes a first dielectric composition, the first dielectric composition comprises stabilized zirconia, the stabilized zirconia may contain one or more of yttria stabilized zirconia, magnesium oxide stabilized zirconia, cerium oxide stabilized zirconia, aluminum oxide stabilized zirconia, and calcium oxide stabilized zirconia.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, with reference to specific embodiments and accompanied drawings, the embodiments of the present disclosure will be described. However, the embodiments of the present disclosure may be modified into various other forms, and the scope of the present disclosure is not limited to the embodiments described below. In addition, the embodiments of the present disclosure are provided to more fully describe the present disclosure to those skilled in the art. Therefore, the shape and size of the elements in the drawings may be exaggerated for a clearer explanation, and the elements represented by the same reference marks on the drawings are the same elements.

In order to clearly describe the present disclosure in the drawings, parts that are not related to the description are omitted, and the size and thickness of each formation shown in the drawings are arbitrarily shown for the convenience of the description, so that the present disclosure is not necessarily limited to the shown configuration. In addition, components with the same function within the scope of the same idea are described using the same reference marks. Further, when a part "includes" an element in the entire description, it means that it may further include the other element rather than excluding other elements unless specifically stated to the contrary.

In the figure, a first direction may be defined as a stacking direction or a thickness T direction, a second direction as a length L direction, and a third direction as a width W direction.

Multilayer Electronic Component

Figure 1:
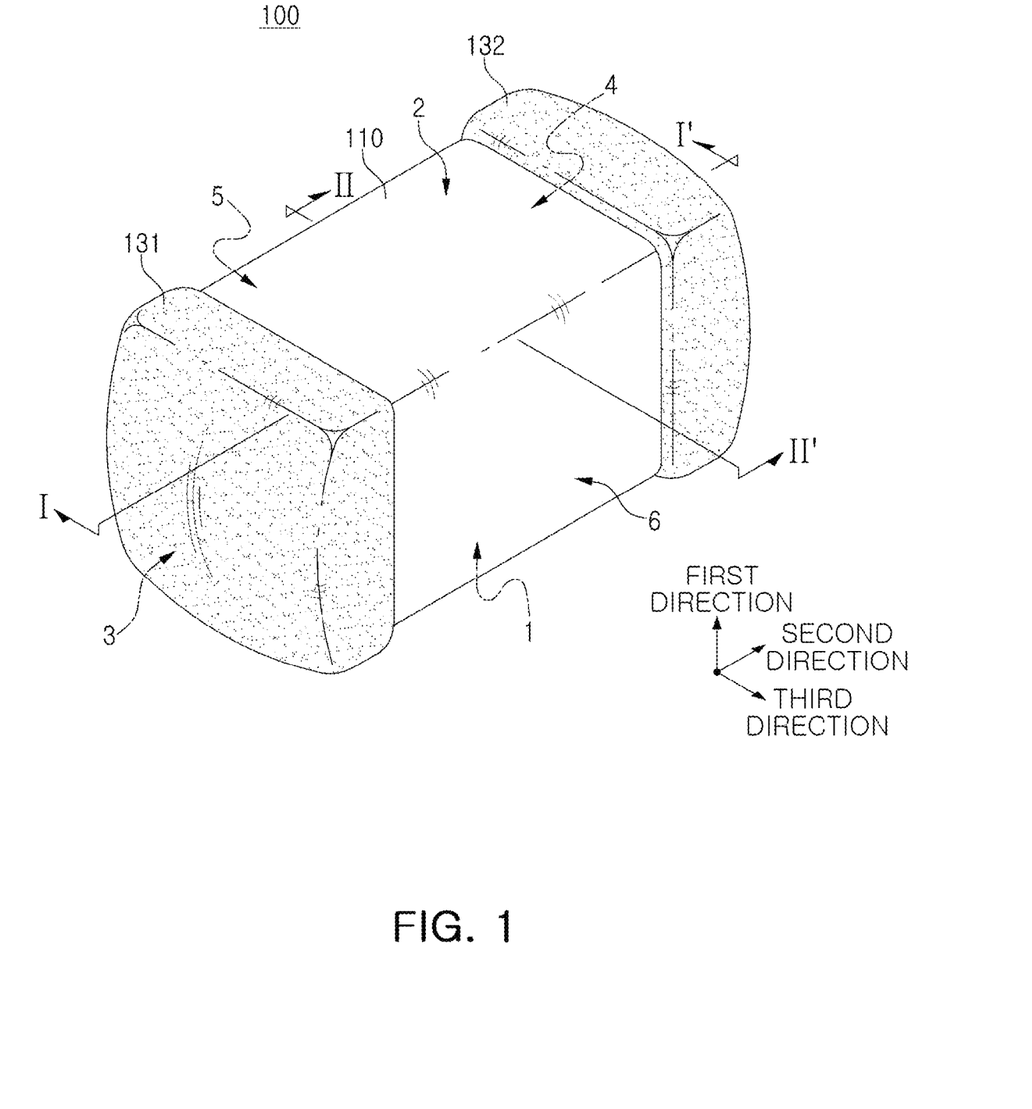
FIG. 1 is a perspective view of a multilayer electronic component according to an embodiment of the present disclosure.

FIG. 1 is a perspective view of a multilayer electronic component according to an embodiment of the present disclosure.

Figure 2:
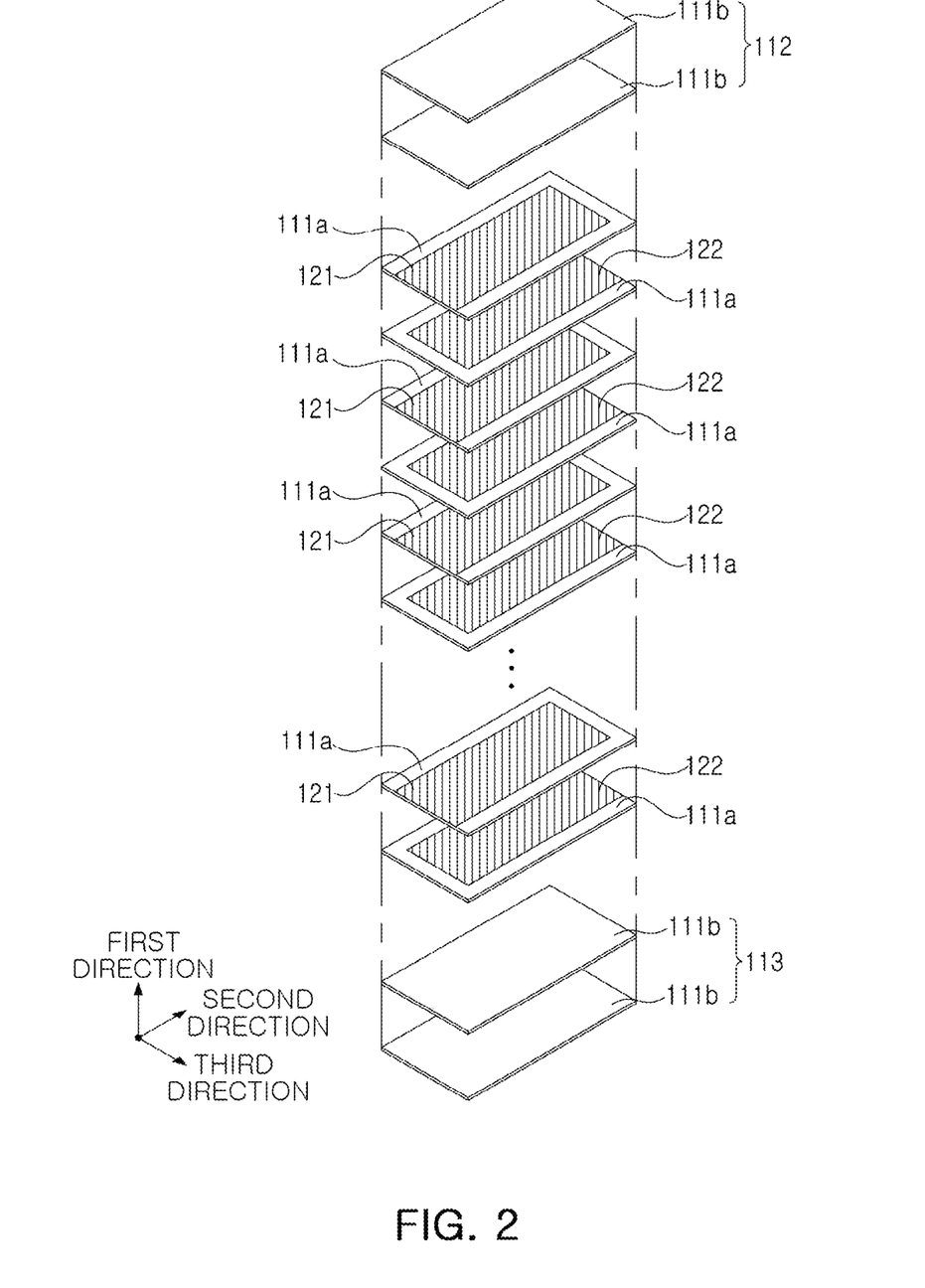
FIG. 2 is a schematic exploded view of a body of the multilayer electronic component according to an embodiment of the present disclosure.

FIG. 2 is a schematic exploded view of a body of the multilayer electronic component according to an embodiment of the present disclosure.

Figure 3:
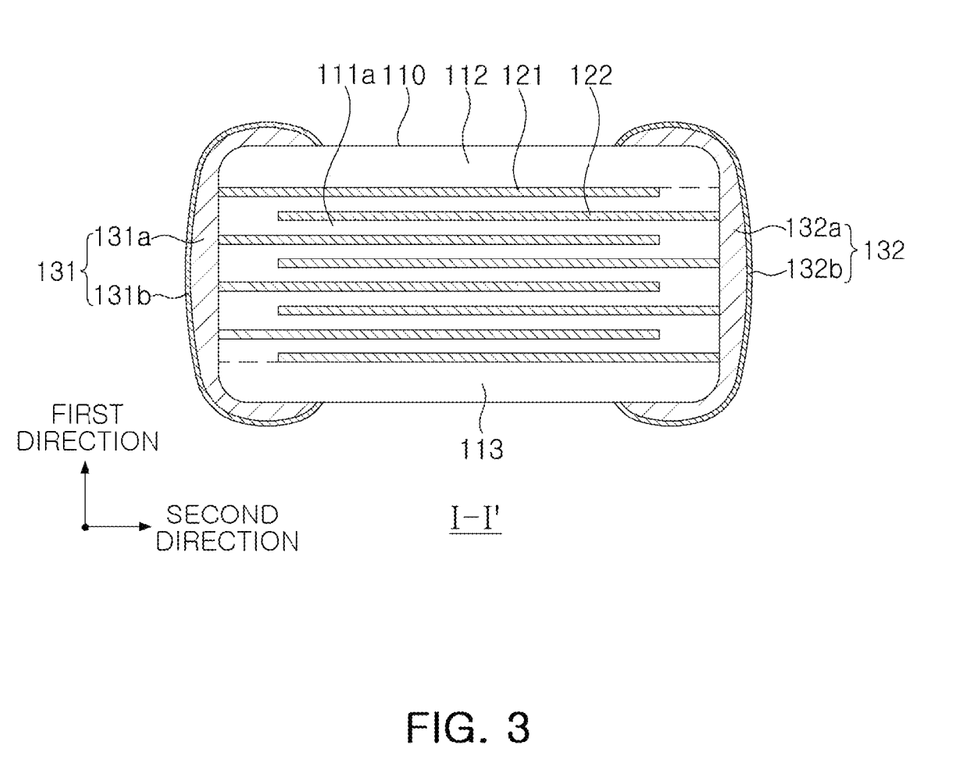
FIG. 3 is a view schematically illustrating a cross section taken along line I-I' of FIG. 1.

FIG. 3 is a view schematically illustrating a cross section taken along line I-I' of FIG. 1.

Figure 4:
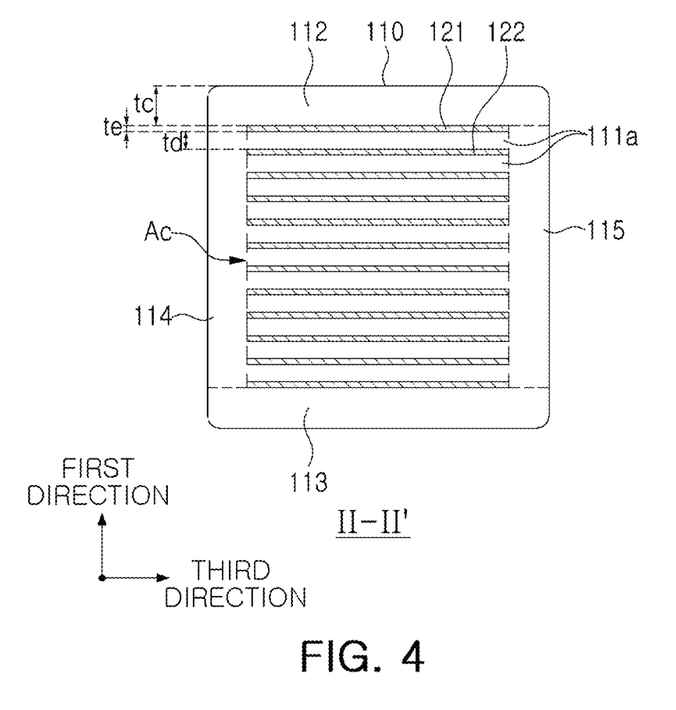
FIG. 4 is a view schematically illustrating a cross section taken along line II-II' of FIG. 1.

FIG. 4 is a view schematically illustrating a cross section taken along line II-II' of FIG. 1.

Figure 5A:
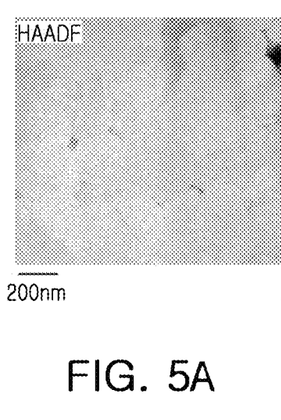
FIGS. 5A to 5C are images captured by TEM-EDS of a first dielectric layer of the multilayer electronic component according to an embodiment of the present disclosure.
Figure 5B:
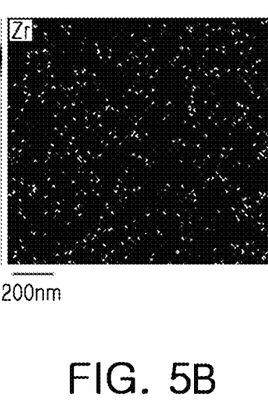
Figure 5C:
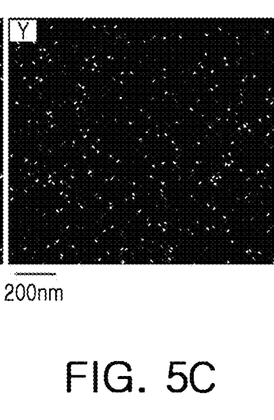

FIG. 5 is an image captured by TEM-EDS of a first dielectric layer of the multilayer electronic component according to an embodiment of the present disclosure.

Hereinafter, with reference to FIGS. 1 to 5C, a multilayer electronic component according to an embodiment of the present disclosure will be described in detail. However, as an example of a multilayer electronic component, a multilayer ceramic capacitor will be described, but the present disclosure may be applied to various electronic products using a dielectric composition, such as, an inductor, a piezoelectric device, a varistor, or a thermistor.

The multilayer electronic component 100 according to an embodiment of the present disclosure comprises a body including an active portion Ac including a plurality of first dielectric layers 111a and first and second internal electrodes 121 and 122 alternately disposed between the first dielectric layers 111a to form capacitance, a body comprising first and second surfaces 1 and 2 opposing each other in a first direction, and third and fourth surfaces 3 and 4 connected to the first and second surfaces 1 and 2 and opposing each other in a second direction, and fifth and sixth surfaces 5 and 6 connected to the first to fourth surfaces 1, 2, 3 and 4 and opposing each other in a third direction; and first and second external electrodes 131 and 132 disposed on the body 110 and connected to the first and second internal electrodes 121 and 122, respectively, wherein the first dielectric layer 111a may comprise stabilized zirconia.

In the present description, the "dielectric layer" may refer to a first dielectric layer 111a included in the active portion Ac, a second dielectric layer 111b included in cover portions 112 and 113, and a third dielectric layer 111c included in the margin portions 114 and 115. A detailed description of the first to third dielectric layers 111a, 111b, and 111c will be described below.

In the present description, the "peripheral portion" may refer to a cover portion as disclosed herein, a margin portion as disclosed herein, or both.

A body 110 includes the first dielectric layer 111a alternately stacked with the internal electrodes 121 and 122.

More specifically, a body 110 is disposed inside the body 110 and includes the first internal electrode 121 and the second internal electrode 122 that are alternately disposed opposing each other with the first dielectric layer 111a in between.

Although there is no particular limitation on a specific shape of the body 110, as shown, the body 110 may be made of a cube shape or a similar shape. Due to the contraction of the ceramic powder contained in the body 110 during the sintering process, the body 110 may not have a hexahedral shape with complete straight lines, but a substantial hexahedral shape.

The body 110 may comprise the first and second surfaces 1 and 2 that face each other in the first direction, and the third and fourth surfaces 3 and 4 that are connected to the first and second surfaces 1 and 2 opposing each other in the second direction, and the fifth and sixth surfaces 5 and 6 that are connected to the first to the fourth surfaces 1, 2, 3 and 4 opposing each other in the third direction.

The plurality of first dielectric layers 111a forming the body 110 are in a calcined state, and the border between the adjacent first dielectric layers 111a may be integrated so that it is difficult to check unless using a scanning electron microscope (SEM).

The raw material forming the first dielectric layer 111a is not limited as long as sufficient capacitance can be obtained. In general, perovskite ($ABO_3$) based materials may be used, for example, barium titanate materials, lead composite perovskite materials, or strontium titanium oxide-based materials. Barium titanate materials may include $BaTiO_3$ based ceramic powders. $BaTiO_3$, and $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$), which are $BaTiO_3$ with partially employed Ca(calcium) and Zr(zirconium), etc., may be used as examples of ceramic powders.

In addition, the raw material for forming the first dielectric layer 111a may be powders such as barium titanate ($BaTiO_3$) to which various ceramic additives, organic solvents, binders, dispersants, and etc., are added according to the object of the present disclosure.

On the other hand, when manufacturing the dielectric powders used in the MLCC, a milling process may be used to atomize the dielectric powders, and in this case, zirconium beads may be used as a media. Due to the nature of the milling process, zirconium (Zr), a component of zirconium beads, may be introduced into the dielectric powder as an impurity, and the zirconium introduced as an impurity has been identified as a factor that may affect various characteristics such as electrical properties, dielectric capacitance, DF (dissipation factor), and BDV (breakdown voltage) of the dielectric powder. However, the zirconium currently has difficulty controlling its content and relies only on inflow control.

In an embodiment of the present disclosure, stabilized zirconia may be added to the dielectric composition to improve the electrical properties, capacitive properties, DF and BDV properties of the multilayer electronic component.

More specifically, the first dielectric layer 111a included in the active portion Ac forming the capacitance may comprise stabilized zirconia.

Here, the stabilized zirconia may include one or more of the following: yttria-stabilized zirconia, magnesium oxide stabilized zirconia, cerium oxide stabilized zirconia, aluminum oxide stabilized zirconia and calcium oxide stabilized zirconia.

Stabilized zirconia may be defined as a material in which a stabilizer is added to zirconium in order to prevent problems such as grain collapse that may follow when a volume change occurs due to the temperature change of zirconium. For example, yttria stabilized zirconia (YSZ) corresponds to a material made to be stable at room temperature by adding yttrium acid (yttria) to zirconium oxide (zirconia). By adding yttria to zirconia, some of the $Zr4+$ ions are replaced by $Y3+$. This replaces four $O2-$ ions with three $O2-$ ions, resulting in an oxygen vacancy. By the oxygen vacancy thus generated, yttria stabilized zirconia has O2-ion conductivity, and the higher the temperature gets, the better the conductivity becomes, and the toughness and strength may also be improved.

On the other hand, the type of stabilized zirconia is not limited to the above-described type, and according to the type of beads used as a media in the milling process, or when the electrical properties are to be improved in various environments, the necessary kind of stabilized zirconia may be added.

In addition, the first dielectric layer 111a may be formed using a first dielectric composition, and the first dielectric composition may comprise stabilized zirconia.

Stabilized zirconia added to the first dielectric composition may play the role of a sintering accelerator of the dielectric powder, and accordingly, the dielectric grain grows during the sintering process, and the dielectric permittivity is increased, thereby increasing the capacitance. That is, when stabilized zirconia is added to the first dielectric composition to form the first dielectric layer 111a, the electrical properties of the active portion Ac may be improved.

For example, in the case of yttria stabilized zirconia (YSZ), since the sintering temperature is at 1,300° C. or more, which is higher than $BaTiO_3$ (BT), used generally as a dielectric composition, if BT and YSZ are mixed and sintered together it may be a composite that remains in a secondary phase, and when the sintering temperature is become higher, YSZ may be decomposed into yttrium (Y) and zirconium (Zr). Depending on the heat treatment temperature, atmosphere, and process conditions, YSZ may remain as YSZ without decomposition even after sintering, or some may be decomposed into Y and Zr, or all YSZ may be decomposed into Y and Zr. At this time, even if YSZ is formed as in the form of YSZ, Y and Zr, electrical properties can be improved. Accordingly, appropriate control is preferably performed according to the manufacturing process.

At this time, even if a small amount (greater than 0 ppm) of yttria stabilized zirconia is added, the electrical properties may be improved, and it may be desirable to add at least 200 ppm.

In an embodiment of the present disclosure, at least one of the plurality of first dielectric layers 111a included in the active portion Ac may comprise zirconium.

In addition, in an embodiment of the present disclosure, at least one of the plurality of first dielectric layers 111a included in the active portion Ac may comprise yttrium.

Zirconium and yttrium included in the first dielectric layer 111a may be the result of the detection of zirconium or yttrium elements in the first dielectric layer 111a as stabilized zirconia, with the addition of yttria stabilized zirconia to the first dielectric composition.

Referring to FIGS. 5A to 5C, a component analysis of yttria stabilized zirconia, zirconium and yttrium may be performed using transmission electron microscopy-energy dispersive X-ray spectroscopy (TEM-EDS). Other methods and/or tools appreciated by one of ordinary skill in the art, even if not described in the present disclosure, may also be used.

After grinding the chip, which is a multilayer electronic component that has been calcined, to the ½ point of the third direction based on the cross-sections of the first and second directions, any first dielectric layer 111a may be analyzed by TEM-EDS to proceed with component analysis. At this time, components of yttria stabilized zirconia, zirconium and yttrium located in an area set based on the center point of a cross-section of the first and second directions may be analyzed.

In addition, yttria stabilized zirconia, zirconium and yttrium may be quantitatively analyzed using inductively coupled plasma optical emission spectroscopy (ICP-OES) equipment. Other methods and/or tools appreciated by one of ordinary skill in the art, even if not described in the present disclosure, may also be used.

For ICP-OES analysis, the pretreatment conditions are important, and the pretreatment conditions are as follows:

0.1~0.2 g of sample chip and 1~2 g of $LiBO_2$ (lithium metaborate) are diluted 10~20 times, placed in a platinum crucible, and melted at a temperature of 1050° C. for 3 hours. The molten platinum crucible is inserted into a 250 ml beaker (low 250 ml) and a 10% concentration of nitric acid aqueous solution is poured until the platinum crucible is submerged (about 200 ml). The beaker is covered with a watch glass and the ultrasonic dissolution is proceeded in a 60~70° C. thermostatic bath for 60 minutes. At this time, the ultrasonic dissolution is carried out until there is no residue inside the platinum crucible. Remove the platinum crucible from the beaker, check for any residue, and rinse off the filtrate with ultrapure water (UPW). After lowering the temperature of the sample with the melted chip to 25° C. from the room temperature, it is poured into a 250 ml flask, and ultrapure water is added to adjust it to the 250 ml volume.

The Perkin Elmer Avio 200 device may then be used to quantitatively analyze zirconium and yttrium content. The calibration curve may be set by diluting 10, 100 and 1000 times using a standard sample, and it may be considered effective when 99.99% or more is satisfied. When analyzing components using calibration curves set through standard samples, ppm of quantified samples may be analyzed. The content measured by this way may mean an average content.

The thickness td of the first dielectric layer 111a does not need to be particularly limited.

However, in order to more easily achieve miniaturization and higher capacitance of multilayer electronic components, the thickness of the first dielectric layer 111a may be 0.6 µm or less, more preferably 0.4 µm or less.

Here, the thickness td of the first dielectric layer 111a may mean the thickness of the second dielectric layer 111b and the third dielectric layer (not shown) described below.

The thickness td of the first dielectric layer 111a may mean the thickness td of the first dielectric layer 111a disposed between the first and second internal electrodes 121 and 122.

Meanwhile, the thickness td of the first dielectric layer 111a may mean the size of the first dielectric layer 111a along the first direction. In addition, the thickness td of the first dielectric layer 111a may mean the average thickness td of the first dielectric layer 111a and the average size the first dielectric layer 111a along the first direction.

The average size of the first dielectric layer 111a along the first direction may be measured by scanning the images of the cross-sections of the first and second directions of the body 110 with a scanning electron microscope (SEM) at 10,000 magnifications. More specifically, it may be an average value measuring the size of the first dielectric layer 111a along the first direction at 30 equidistant interval points in the second direction in order to measure one first dielectric layer 111a from a scanned image. The 30 equidistant interval points may be designated in the active portion Ac. In addition, if the average value measurement is extended to 10 first dielectric layers 111a to measure the average value, the average size of the first dielectric layer 111a along the first direction may be further generalized. Other methods and/or tools appreciated by one of ordinary skill in the art, even if not described in the present disclosure, may also be used.

The internal electrodes 121 and 122 may be alternately stacked with the first dielectric layer 111a.

The internal electrodes 121 and 122 may include a first internal electrode 121 and a second internal electrode 122, and the first and second internal electrodes 121 and 122 are alternately arranged to face each other with the first dielectric layer 111a in between that constitutes the body 110, and may be exposed to the third and fourth surfaces 3 and 4, respectively, of the body 110.

More specifically, the first internal electrode 121 is spaced apart from the fourth surface 4 and may be exposed through the third surface 3, and the second internal electrode 122 is spaced apart from the third surface 3 and may be exposed through the fourth surface 4. The first external electrode 131 is disposed on the third surface 3 of the body 110 and connected to the first internal electrode 121, and the second external electrode 132 is disposed on the fourth surface 4 of the body 110 and connected to the second internal electrode 122.

That is to say, the first internal electrode 121 is not connected to the second external electrode 132 but is connected to the first external electrode 131, and the second internal electrode 122 is not connected to the first external electrode 131 and may be connected to the second external electrode 132. In this case, the first and second internal electrodes 121 and 122 may be electrically separated from each other by the first dielectric layer 111a disposed there in between.

Meanwhile, the body 110 may be formed by alternately stacking a ceramic green sheet printed with the first internal electrode 121 and a ceramic green sheet printed with the second internal electrode 122, and then formed by sintering.

The materials forming the internal electrodes 121 and 122 are not particularly limited, and materials having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti) and alloys thereof.

In addition, the internal electrodes 121 and 122 may be formed with a conductive paste for internal electrodes containing one or more of nickel (Ni), copper (Cu), palladium (Pd), silver (Ag), gold (Au), platinum (Pt), tin (Sn), tungsten (W), titanium (Ti) and alloys thereof, printed on a ceramic green sheet. For the printing method of the conductive paste for the internal electrode, a screen printing method or a gravure printing method may be used, and the present disclosure is not limited thereto.

On the other hand, the thickness to of the internal electrodes 121 and 122 does not need to be particularly limited.

However, in order to more easily achieve miniaturization and higher capacitance of multilayer electronic components, the thickness of the internal electrodes 121 and 122 may be 0.6 µm or less, more preferably 0.4 µm or less.

Here, the thickness te of the internal electrodes 121 and 122 may mean the size of the internal electrodes 121 and 122 along the first direction. In addition, the thickness te of the internal electrodes 121 and 122 may mean the average thickness te of the internal electrodes 121 and 122, and may mean the average size of the internal electrodes 121 and 122 along the first direction.

The average size of the internal electrodes 121 and 122 along the first direction may be measured by scanning the images of the cross-sections of the first and second directions of the body 110 with a scanning electron microscope (SEM) at 10,000 magnifications. More specifically, it may be an average value measuring the size of internal electrodes 121 and 122 along the first direction at 30 equidistant interval points in the second direction in order to measure one internal electrode 121 and 122 from a scanned image. The 30 equidistant interval points may be designated in the active portion Ac. In addition, if the average value measurement is extended to the 10 internal electrodes 121 and 122 to measure the average value, the average size of the internal electrodes 121 and 122 along the first direction may be further generalized. Other methods and/or tools appreciated by one of ordinary skill in the art, even if not described in the present disclosure, may also be used.

Meanwhile, the body 110 may include cover portions 112 and 113 disposed on the end-surfaces of the first direction of the active portion Ac.

More specifically, the upper cover portion 112 disposed in the upper part of the first direction of the active portion Ac and the lower cover portion 113 disposed in the lower part of the first direction of the active portion Ac may be included.

In an embodiment of the present disclosure, the cover portions 112 and 113 include a second dielectric layer 111b, and the second dielectric layer 111b is formed using a second dielectric composition, however, the second dielectric composition may not include (may be free of) stabilized zirconia. At this time, preferably the second dielectric layer 111b may not include (may be free of) stabilized zirconia.

More specifically, the upper cover portion 112 and the lower cover portion 113 may be formed by stacking a single second dielectric layer 111b or two or more second dielectric layers 111b in the upper and lower surfaces of the first direction of the active portion Ac, respectively, in the first direction.

The second dielectric layer 111b may be formed using a second dielectric composition, and unlike the first dielectric composition forming the first dielectric layer 111a, the second dielectric composition may not include (may be free of) stabilized zirconia.

As the stabilized zirconia added to the first dielectric composition is intended to improve electrical properties, the stabilized zirconia may not be added to the second dielectric composition forming the second dielectric layer 111b of the cover portions 112 and 113 that does not contribute to the dielectric capacitance.

In an embodiment of the present disclosure, the average content of zirconium included in the first dielectric layer 111a may be higher than the average content of zirconium included in the second dielectric layer 111b. In addition, the average content of yttrium included in the first dielectric layer 111a may be higher than the average content of yttrium included in the second dielectric layer 111b.

In the process of sintering the multilayer electronic component, as the diffusion by heat treatment proceeds at the border surfaces of the active portion Ac including the first dielectric layer 111a and of the cover portions 112 and 113 including the second dielectric layer 111b, the stabilized zirconia included in the first dielectric composition, for example, yttria-stabilized zirconia, may include zirconium or yttrium in the second dielectric layer 111b of the cover portions 112 and 113.

The average content of zirconium or yttrium contained in the first and second dielectric layers 111a and 111b may be measured through quantitative analysis using the ICP-OES analysis equipment described above, and the active portion Ac, the cover portions 112 and 113, or the margin portions 114 and 115 described later may be distinguished to quantitatively analyze the components included in each formation.

The second dielectric composition may comprise the same material as the first dielectric composition, except for stabilized zirconia.

That is, the cover portions 112 and 113 may include ceramic materials such as, barium titanate ($BaTiO_3$) based ceramic materials.

The cover portions 112 and 113 may basically play a role in preventing damage to the internal electrodes 121 and 122 by physical or chemical stress.

In addition, the upper cover portion 112 and the lower cover portion 113 may not include the internal electrodes 121 and 122.

On the other hand, the thickness tc of the cover portions 112 and 113 does not need to be particularly limited.

However, in order to more easily achieve miniaturization and higher capacitance of multilayer electronic component, the thickness tc of the cover portions 112 and 113 may be 100 μm or less, preferably 30 μm or less, and more preferably 20 μm or less in ultra-small products.

Here, the thickness tc of the cover portions 112 and 113 may mean the size of the cover portions 112 and 113 along the first direction. In addition, the thickness tc of the cover portions 112 and 113 may mean the average thickness tc of the cover portions 112 and 113, and may mean the average size of the cover portions 112 and 113 along the first direction.

The average size of the cover portions 112 and 113 along the first direction may be measured by scanning the images of the cross-sections of the first and third directions of the body 110 with a scanning electron microscope (SEM) at 10,000 magnifications. More specifically, it may be an average value measuring the thickness at 30 equidistant interval points in the third direction in order to measure one cover part from a scanned image. The 30 equidistant interval points may be designated in the upper cover portion 112. Other methods and/or tools appreciated by one of ordinary skill in the art, even if not described in the present disclosure, may also be used.

According to an embodiment of the present disclosure, the body 110 may further include margin portions 114 and 115 disposed on end-surfaces of the third direction of the active portion Ac.

More specifically, the margin portions 114 and 115 may include a first margin portion 114 disposed on the fifth surface 5 of the active portion Ac and a second margin portion 115 disposed on the sixth surface 6.

As shown, the margin portions 114 and 115 may mean an area between the end-surfaces of the third direction of the first and the second internal electrodes 121 and 122 and the border surface of the body 110, based on the cross-sections cut in the first and third directions of the body 110.

The margin portions 114 and 115 may basically serve to prevent damage to the internal electrodes 121 and 122 by physical or chemical stress.

The margin portions 114 and 115 may be formed with the internal electrodes 121 and 122 formed by applying a conductive paste on the ceramic green sheet except the place where the margin portions 114 and 115 are formed. And in order to suppress an offset by the internal electrodes 121 and 122, the internal electrodes 121 and 122 are cut, after stacking, to be exposed to the fifth and sixth surfaces 5 and 6 of the active portion Ac, and then a single third dielectric layer (not shown) or two or more third dielectric layers (not shown) are stacked in the third direction on the end-surface of the third direction of the active portion Ac.

In an embodiment of the present disclosure, the margin portions 114 and 115 include a third dielectric layer (not shown), and the third dielectric layer (not shown) is formed using a third dielectric composition, where the third dielectric composition may not include (may be free of) stabilized zirconia.

In this case, the first margin portion 114 and the second margin portion 115 may form a single third dielectric layer (not shown) or two or more third dielectric layers (not shown) stacked in the third direction on the end-surface of the third direction of the active portion Ac.

The third dielectric layer (not shown) may be formed using a third dielectric composition, and unlike the first dielectric composition forming the first dielectric layer 111a, the third dielectric composition may not include (may be free of) stabilized zirconia.

As the stabilized zirconia added to the first dielectric composition is intended to improve electrical properties, the stabilized zirconia may not be added to the third dielectric composition that forms a third dielectric layer (not shown) of margin portions 114 and 115 that does not contribute to dielectric capacitance.

In an embodiment of the present disclosure, the average content of zirconium included in the first dielectric layer 111a may be higher than the average content of zirconium included in the third dielectric layer (not shown), and the average content of yttrium included in the first dielectric layer 111a may be higher than the average content of yttrium included in the third dielectric layer (not shown).

In the sintering process of the multilayer electronic component, as the diffusion by heat treatment proceeds at the border surfaces of the active portion Ac including the first dielectric layer 111a and of the margin portions 114 and 115 including the third dielectric layer (not shown), the stabilized zirconia included in the first dielectric composition, for example, yttria stabilized zirconia, may include zirconium or yttrium in the third dielectric layer of the margin portions 114 and 115.

The average content of zirconium or yttrium contained in the third dielectric layer (not shown) of the margin portions 114 and 115 may be measured through quantitative analysis using an ICP-OES analysis equipment.

The third dielectric composition may comprise the same material as the first dielectric composition, except for stabilized zirconia. Alternatively, the third dielectric composition may correspond to the same material as the second dielectric composition.

That is, the margin portions 114 and 115 may include ceramic materials, for example, barium titanate ($BaTiO_3$) based ceramic materials.

The margin portions 114 and 115 may basically serve to prevent damage to the internal electrodes 121 and 122 by physical or chemical stress.

In addition, the first margin portion 114 and the second margin portion 115 may not include the internal electrodes 121 and 122.

On the other hand, the width of the margin portions 114 and 115 does not need to be particularly limited.

However, in order to more easily achieve miniaturization and higher capacitance of the multilayer electronic component 100, the width of the margin portions 114 and 115 may be 100 μm or less, preferably 30 μm or less, and more preferably 20 μm or less in an ultra-small product.

Here, the width of the margin portions 114 and 115 may mean the size of the margin portions 114 and 115 along the third direction. In addition, the width of the margin portions 114 and 115 may mean the average width of the margin portions 114 and 115, and may mean the average size of the margin portions 114 and 115 along the third direction.

The average size of the margin portions 114 and 115 along the third direction may be measured by scanning the images of the cross-sections of the first and third direction of the body 110 with a scanning electron microscope (SEM) at 10,000 magnifications. More specifically, it may be an average value measuring the size of the margin portions 114 and 115 along the third direction at 30 equidistant interval points in the first direction in order to measure one margin portion from a scanned image. The 30 equidistant interval points may be designated in the first margin portion 114. Other methods and/or tools appreciated by one of ordinary skill in the art, even if not described in the present disclosure, may also be used.

In an embodiment of the present disclosure, the multilayer electronic component 100 describes a structure comprising two external electrodes 131 and 132, but the number or shape of the external electrodes 131 and 132 may be changed according to the form of the internal electrodes 121 and 122 or other purposes.

The external electrodes 131 and 132 may be disposed on the body 110 and connected to the internal electrodes 121 and 122.

More specifically, the external electrodes 131 and 132 are disposed on the third and fourth surfaces 3 and 4 of the body 110, respectively, and may include the first and the second external electrodes 131 and 132 that are connected to the first and second internal electrodes 121 and 122, respectively. That is, the first external electrode 131 may be disposed on the third surface 3 of the body and connected to the first internal electrode 121, and the second external electrode 132 may be disposed on the fourth surface 4 of the body to be connected to the second internal electrode 122.

The external electrodes 131 and 132 may be formed with any material having electrical conductivity, and a specific material may be determined in consideration of electrical properties, structural stability, and etc., and may have a multilayer structure.

For example, the external electrodes 131 and 132 may include electrode layers 131a and 132a disposed on the body 110 and plating layers 131b and 132b disposed on the electrode layers 131a and 132a.

To give a more specific example of the electrode layers 131a and 132a, the electrode layers 131a and 132a may be sintering electrodes including conductive metals and glass, or resin-based electrodes including conductive metals and resins.

In addition, the electrode layers 131a and 132a may be in the form of sequentially formed sintering electrodes and resin-based electrodes on the body.

In addition, the electrode layers 131a and 132a may be formed in a manner of transferring a sheet including a conductive metal on the body or by transferring a sheet including a conductive metal on a sintering electrode.

The conductive metal used in the electrode layers 131a and 132a is not particularly limited as long as it is a material that may be electrically connected to the internal electrodes 121 and 122 for capacitance formation. For example, it may include one or more from the group of selected elements, such as nickel (Ni), copper (Cu), palladium (Pd), silver (Ag), gold (Au), platinum (Pt), tin (Sn), tungsten (W), titanium (Ti) and alloys thereof. The electrode layers 131a and 132a may be formed by applying a conductive paste prepared by adding a glass frit to the conductive metal powders and then sintering it.

The plating layers 131b and 132b serve to improve the mounting properties.

The types of plating layers 131b and 132b are not particularly limited and may be a single layer of plating layers 131b and 132b comprising one or more of nickel (Ni), tin (Sn), palladium (Pd) and alloys thereof, and may be formed of a plurality of layers.

For a more specific example of the plating layers 131b and 132b, the plating layers 131b and 132b may be a Ni plating layer or an Sn plating layer, or may be the Ni plating layer and the Sn plating layer sequentially formed on the electrode layers 131a and 132a, or may be the Sn plating layer, the Ni plating layer and the Sn plating layer sequentially formed. In addition, the plating layers 131b and 132b may include a plurality of Ni plating layers and/or a plurality of Sn plating layers.

Although the embodiments of the present disclosure have been described in detail above, the present disclosure is not limited by the above-described embodiments and accompanied drawings, but it is intended to be limited by the appended claims. Therefore, various forms of substitution, modification and changes will be possible by skilled persons in the art within the scope of the technical spirit of the present disclosure described in the claims, and this will also be said to fall within the scope of the present disclosure.

The multilayer electronic component 100 according to an embodiment of the present disclosure describes a size of 3216 (length×width, 3.2 mm×1.6 mm) as an embodiment, but it is not particularly limited thereto.

Hereinafter, the present disclosure will be described in more detail through examples, but this is to help a detailed understanding of the disclosure, and the scope of the present disclosure is not limited to the embodiments.

Embodiment

Table 1 below shows the data of an evaluation of the electrical properties of sample 1 in which a sample chip was prepared without adding YSZ to the first dielectric layer 111a which is the area of the active portion Ac and of samples 2 and 3 in which sample chips were prepared by adding YSZ.

The sample chip used as the sample was produced in size 3216 (length×width, 3.2 mm×1.6 mm).

The sample 1 corresponds to a sample chip produced using a $BaTiO_3$ based dielectric composition to which YSZ is not added.

The sample 2 corresponds to a sample chip prepared using a dielectric composition to which 200 ppm of YSZ was added. The components of the dielectric composition except for the presence of YSZ are the same as in the sample 1.

The sample 3 corresponds to a sample chip prepared using a dielectric composition to which 400 ppm of YSZ was added. The content of the added YSZ is higher than that of sample 2. The components of the dielectric composition except for the presence of YSZ are the same as in the sample 1.

DF (dissipation factor) is an eigen constant of the dielectric that indicates the degree to which the size of the input signal decreases and the heat is generated due to the loss of energy of the input signal caused by the vibration of electrons around the atom in the dielectric. C is a value representing the dielectric capacitance, and the unit is μF. The capacitance percentage refers to the rate of change of the capacitance compared to 4.7 µF, which is a reference dose value among the 3216 (length×width, 3.2 mm×1.6 mm) size.

As a quantitative analysis method, it may be analyzed by ICP-OES, and the pretreatment conditions are important for ICP-OES analysis, and the pretreatment conditions are as follows.

0.1~0.2 g of sample chip and 1~2 g of $LiBO_2$ (lithium metaborate) are diluted 10~20 times, placed in a platinum crucible, and melted at 1050° C. for 3 hours. The molten platinum crucible is inserted into a 250 ml beaker and a 10% concentration of nitric acid aqueous solution is poured until the platinum crucible is submerged (about 200 ml). The beaker is covered with a watch glass and the ultrasonic dissolution is proceeded in a 60~70° C. thermostatic bath for 60 minutes. The ultrasonic dissolution is carried out until there is no residue inside the platinum crucible. After taking the platinum crucible from the beaker and check the residue, the filtrate is rinsed with ultrapure water (UPW).

When the sample with the chip melted is left at room temperature and is lowered to 25° C., it is poured into a 250 ml flask, and ultrapure water (UPW) is added to adjust it to the 250 ml volume.

Quantitative analysis of Zr and Y content was performed on the Perkin Elmer Avio 200 device, and the calibration curve was set by diluting 10, 100, and 1000 times using a standard sample, and it is effective if 99.99% or more is satisfied. When analyzing components using calibration curves set through standard samples, ppm of quantified samples may be analyzed.

TABLE 1

| Measured sample No. | Measuring equipment ICP-OES | | Electrical properties | | |
|---|---|---|---|---|---|
| | Chip | | | | Capacitance |
| | Zr (ppm) | Y (ppm) | DE Avg (%) | C Avg (µF) | Percentage (%) |
| 1 | 637 | 122 | 2.76 | 5.05 | 107.4 |
| 2 | 821 | 133 | 3.11 | 5.28 | 112.4 |
| 3 | 945 | 140 | 3.45 | 5.49 | 116.8 |

Sample 1 is a comparative example in which YSZ is not added, and Zr and Y were detected during ICP-OES analysis in $ZrO_2$ and $Y_2O_3$, which were added as additives.

Sample 2 and sample 3 are the embodiments in which YSZ was added in amounts of 200 ppm and 400 ppm, respectively. Compared to sample 1 in which YSZ is not added, it may be confirmed that the electrical properties DF Avg, C avg and capacitance percentage are increased.

It may be confirmed that the content of the added YSZ satisfies sample 1<sample 2<sample 3 (YSZ was not added in the sample 1), and with the increase of the content of added YSZ, the detected content of Zr and Y in the chip as a final product increases, and the electrical properties are improved as well.

In summary, when the first dielectric layer of the active portion Ac forming the dielectric capacitance is formed using a dielectric composition to which YSZ is added, it may be confirmed that the electrical properties are improved compared to the case of forming it using a dielectric composition without added YSZ.

The expression 'an embodiment' used in this description does not refer to the same embodiments, and is provided to emphasize and describe each different unique feature. However, the embodiments presented above do not exclude being implemented in combination with features of other embodiments. For example, even if a point described in an embodiment is not described in another embodiment, it may be understood as a description related to another embodiment, unless there is a description that is contrary or contradictory to the point in another embodiment.

The terms used in the present disclosure are used only to describe an embodiment and are not intended to limit the present disclosure. In this case, the singular expression includes the plural expression unless it is clearly meant differently in the context.

One of the various effects of the present disclosure is to improve the electrical properties, dielectric capacitance, DF and BDV of the multilayer electronic component.

However, various beneficial advantages and effects of the present disclosure are not limited to the above-described contents, and this will become clearer to understand during the process of describing specific embodiments of the present disclosure.

While example embodiments have been shown and described above, it will be apparent to those skilled in the art that modifications and variations could be made without departing from the scope of the present invention as defined by the appended claims.

What is claimed is:

1. A multilayer electronic component comprising:
an active portion including:
first dielectric layers, wherein at least one of the first dielectric layers comprises stabilized zirconia, wherein the at least one of the first dielectric layers further comprises yttrium, and an average content of yttrium included in the at least one of the first dielectric layers comprising yttrium is greater than 122 ppm, and
first and second internal electrodes alternately disposed between the first dielectric layers to form capacitance,
a body comprising first and second surfaces opposing each other in a first direction, third and fourth surfaces connected to the first and second surfaces and opposing each other in a second direction, and fifth and sixth surfaces connected to the first to fourth surfaces and opposing each other in a third direction; and
first and second external electrodes disposed on the body and connected to the first and second internal electrodes respectively.

2. The multilayer electronic component of claim 1, wherein the stabilized zirconia includes one or more of yttria stabilized zirconia, magnesium oxide stabilized zirconia, cerium oxide stabilized zirconia, aluminum oxide stabilized zirconia, and calcium oxide stabilized zirconia.

3. The multilayer electronic component of claim 1, wherein the at least one of the first dielectric layers comprises zirconium, and
an average content of zirconium included in the at least one of the first dielectric layers comprising zirconium is greater than 637 ppm.

4. The multilayer electronic component of claim 3, wherein the average content of zirconium included in the at least one of the first dielectric layers comprising zirconium is 1090 ppm or less.

5. The multilayer electronic component of claim 1, wherein the average content of yttrium included in the at least one of the first dielectric layers comprising yttrium is 140 ppm or less.

6. The multilayer electronic component of claim 1, wherein the body further comprises cover portions disposed on surfaces of the active portion opposing each other in the first direction.

7. The multilayer electronic component of claim 6, wherein
at least one of the cover portions includes a second dielectric layer, and
the second dielectric layer is free of stabilized zirconia.

8. The multilayer electronic component of claim 7, wherein
an average content of zirconium included in the at least one of the first dielectric layers is higher than an average content of zirconium included in the second dielectric layer, and
an average content of yttrium included in the at least one of the first dielectric layers is higher than an average content of yttrium included in the second dielectric layer.

9. The multilayer electronic component of claim 1, wherein
the body further comprises margin portions disposed on surfaces of the active portion opposing each other in the third direction.

10. The multilayer electronic component of claim 9, wherein
the margin portions include a third dielectric layer, and
the third dielectric layer is free of stabilized zirconia.

11. The multilayer electronic component of claim 10, wherein
an average content of zirconium included in the at least one of the first dielectric layers is higher than an average content of zirconium included in the third dielectric layer, and
an average content of yttrium included in the at least one of the first dielectric layers is higher than an average content of yttrium included in the third dielectric layer.

12. The multilayer electronic component of claim 1, wherein an average size of at least one of the first dielectric layers is 0.4 µm or less along the first direction.

13. The multilayer electronic component of claim 1, wherein an average size of at least one of the first and second internal electrodes is 0.4 µm or less along the first direction.

14. The multilayer electronic component of claim 6, wherein an average size of at least one of the cover portions is 100 µm or less along the first direction.

15. The multilayer electronic component of claim 9, wherein an average size of at least one of the margin portions is 100 µm or less along the third direction.

16. A multilayer electronic component, comprising:
a body including:
an active portion including:
first dielectric layers,
first and second internal electrodes alternately disposed between the first dielectric layers to form capacitance, and
first and second surfaces opposing each other in a first direction, third and fourth surfaces connected to the first and second surfaces and opposing each other in a second direction, and fifth and sixth surfaces connected to the first to fourth surfaces and opposing each other in a third direction; and
first and second external electrodes disposed on the body and connected to the first and second internal electrodes, respectively,
wherein at least one of the first dielectric layers is formed using a first dielectric composition,
the first dielectric composition comprises stabilized zirconia, and
the stabilized zirconia contains yttria stabilized zirconia and one or more of magnesium oxide stabilized zirconia, cerium oxide stabilized zirconia, aluminum oxide stabilized zirconia, and calcium oxide stabilized zirconia, wherein the stabilized zirconia material is separately added to the first dielectric layers during preparation and is not introduced via YSZ balls used during raw material mixing and wherein the separately added YSZ content is at least 200 ppm.

17. The multilayer electronic component of claim 16, wherein at least two of the first dielectric layers is formed using the first dielectric composition.

18. The multilayer electronic component of claim 16, wherein the multilayer electronic component comprises a content of zirconium greater than 637 ppm and 1090 ppm or less, and/or a content of yttrium greater than 122 ppm and 140 ppm or less.

19. A multilayer electronic component comprising:
an active portion including:
first dielectric layers, wherein at least one of the first dielectric layers comprises greater than 122 ppm of yttrium, and
first and second internal electrodes alternately disposed between the first dielectric layers to form capacitance,
a body comprising first and second surfaces opposing each other in a first direction, third and fourth surfaces connected to the first and second surfaces and opposing each other in a second direction, and fifth and sixth surfaces connected to the first to fourth surfaces and opposing each other in a third direction; and
first and second external electrodes disposed on the body and connected to the first and second internal electrodes respectively.

* * * * *